US012795127B2

(12) United States Patent
Amado De Assunção et al.

(10) Patent No.: US 12,795,127 B2
(45) Date of Patent: Nov. 10, 2026

(54) IMAGE DATA COMPRESSION METHOD AND DEVICE USING SEGMENTATION AND CLASSIFICATION

(71) Applicants: Instituto De Telecomunicações, Aveiro (PT); Instituto Politécnico De Leiria, Leiria (PT); Universidade De Aveiro, Aveiro (PT)

(72) Inventors: Pedro António Amado De Assunção, Leiria (PT); Sérgio Manuel Maciel De Faria, Leiria (PT); Luis Miguel De Oliveira Pegado De Noronh E Távora, Leiria (PT); António José Nunes Navarro Rodrigues, Aveiro (PT); Rúben Duarte António, Leiria (PT)

(73) Assignees: Instituto de Telecomunicações, Aveiro (PT); Instituto Politécnico De Leiria, Aveiro (PT); Universidade De Aveiro, Aveiro (PT)

( * ) Notice: Subject to any disclaimer, the term of this patent is extended or adjusted under 35 U.S.C. 154(b) by 116 days.

(21) Appl. No.: 18/858,386

(22) PCT Filed: Apr. 19, 2023

(86) PCT No.: PCT/IB2023/054014

§ 371 (c)(1),
(2) Date: Oct. 21, 2024

(87) PCT Pub. No.: WO2023/203509

PCT Pub. Date: Oct. 26, 2023

(65) Prior Publication Data

US 2025/0267295 A1 Aug. 21, 2025

(30) Foreign Application Priority Data

Apr. 19, 2022 (PT) ........................................ 117915

(51) Int. Cl.
*H04N 19/189* (2014.01)
*G06V 10/26* (2022.01)
(Continued)

(52) U.S. Cl.
CPC .......... *H04N 19/189* (2014.11); *G06V 10/26* (2022.01); *G06V 10/764* (2022.01);
(Continued)

(58) Field of Classification Search
CPC .. H04N 19/189; H04N 19/119; H04N 19/124; H04N 19/13; H04N 19/20;
(Continued)

(56) References Cited

U.S. PATENT DOCUMENTS

| | | | | |
|---|---|---|---|---|
| 6,516,090 | B1 * | 2/2003 | Lennon | G06V 10/75 375/E7.111 |
| 7,020,335 | B1 * | 3/2006 | Abousleman | G06V 10/32 382/199 |

(Continued)

FOREIGN PATENT DOCUMENTS

| | | |
|---|---|---|
| WO | WO 2020/091872 | 5/2020 |

OTHER PUBLICATIONS

International Search Report and the Written Opinion Dated Jul. 14, 2023 From the International Searching Authority Re. Application No. PCT/IB2023/054014. (10 Pages).

(Continued)

*Primary Examiner* — John R Schnurr

(57) ABSTRACT

Device and method for image data compression using segmentation and classification, the method comprising the steps of: identifying regions in a received image comprised of image pixels; segmenting the image pixels into segmented regions, each segmented region corresponding to an identified region, and into an image background comprised of image pixels, if existing, not belonging to any of the (Continued)

identified regions; determining a class for each segmented image region from a plurality of predetermined image classification classes; applying an image learning-based encoder to each segmented image region, according to the determined class of each segmented image region, wherein a specific image learning-based encoder has been preselected for each of the image classification classes from a library of image learning-based encoders; outputting the encoded segmented image regions.

23 Claims, 13 Drawing Sheets

(51) Int. Cl.

| | |
|---|---|
| ***G06V 10/764*** | (2022.01) |
| ***G06V 10/774*** | (2022.01) |
| ***G06V 10/82*** | (2022.01) |
| ***H04N 19/119*** | (2014.01) |
| ***H04N 19/124*** | (2014.01) |
| ***H04N 19/13*** | (2014.01) |
| *G06V 40/16* | (2022.01) |

(52) U.S. Cl.
CPC ............ *G06V 10/774* (2022.01); *G06V 10/82* (2022.01); *H04N 19/119* (2014.11); *H04N 19/124* (2014.11); *H04N 19/13* (2014.11); *G06V 40/172* (2022.01)

(58) Field of Classification Search
CPC .... G06V 10/26; G06V 10/764; G06V 10/774; G06V 10/82; G06V 40/172; G06V 10/95; G06V 20/70
See application file for complete search history.

(56) References Cited

U.S. PATENT DOCUMENTS

| | | | | |
|---|---|---|---|---|
| 11,259,040 | B1 | 2/2022 | Sabui et al. | |
| 11,263,261 | B2 * | 3/2022 | Xie | G06F 16/73 |
| 12,401,801 | B2 * | 8/2025 | Keskikangas | H04N 19/162 |
| 2005/0131660 | A1 * | 6/2005 | Yadegar | G06T 9/002 375/240 |
| 2015/0016510 | A1 * | 1/2015 | Carlsson | H04N 19/167 375/240.03 |
| 2016/0173882 | A1 * | 6/2016 | Mishra | H04N 19/426 375/240.08 |
| 2018/0373964 | A1 | 12/2018 | Kondo et al. | |
| 2019/0007690 | A1 * | 1/2019 | Varadarajan | G06V 20/46 |
| 2021/0152834 | A1 * | 5/2021 | Guruva Reddiar | H04N 19/154 |
| 2022/0014764 | A1 * | 1/2022 | Mazumdar | H04N 19/115 |
| 2022/0094928 | A1 | 3/2022 | Amirpour et al. | |
| 2022/0277492 | A1 * | 9/2022 | Ryder | G06N 3/045 |
| 2022/0417533 | A1 * | 12/2022 | Matysik | G06V 10/25 |
| 2023/0025378 | A1 * | 1/2023 | Graziosi | G06N 3/0495 |
| 2023/0028426 | A1 * | 1/2023 | Nadeem | G06T 1/0007 |
| 2023/0162492 | A1 * | 5/2023 | Lee | G06V 10/22 382/156 |
| 2023/0328260 | A1 * | 10/2023 | Keskikangas | H04N 19/162 |
| 2023/0370683 | A1 * | 11/2023 | Panchagnula | G06T 7/11 |
| 2024/0020880 | A1 * | 1/2024 | Zaghetto | G06T 7/62 |
| 2024/0135596 | A1 * | 4/2024 | Akhtar | G06T 9/001 |
| 2025/0069270 | A1 * | 2/2025 | Johnson, Jr. | H04N 19/103 |

OTHER PUBLICATIONS

Relatorio de Pesquisa [Search Report] Dated Oct. 26, 2022 From the Direção de Marcas e Patentes, Instituto Nacional da Propriedade Industrial do Portugal Re. Application No. 117915. (3 Pages).
Ballé et al. "End-to-End Optimized Image Compression", 5th International Conference on Learning Representations, ICLR 2017, Toulon, France, Apr. 2017, ArXiv Preprint ArXiv:1611.01704v3, 27 P., Mar. 3, 2017.
Ballé et al. "Variational Image Compression With a Scale Hyperprior", 6th International Conference on Learning Representations, ICLR 2018, Vancouver, Canada, Apr. 2018, ArXiv Preprint ArXiv:1802.01436v2, 23 P., May 1, 2018.
Bégaint et al. "Compressai: A Pytorch Library and Evaluation Platform for End-to-End Compression Research", ArXiv Preprint ArXiv:2011.03029v1, 19 P., Nov. 5, 2020.
Chamain et al. "End-to-End Optimized Image Compression for Machines, A Study", 2021 Data Compression Conference, DCC 2021, p. 163-172, 2021, ArXiv Preprint ArXiv:2011.06409v1, 10 P., Nov. 10, 2020.
Cheng et al. "Deep Convolutional Autoencoder-Based Lossy Image Compression", IEEE 2018 Picture Coding Symposium, PCS 2018, p. 253-257, Jun. 24, 2018.
Cheng et al. "Learned Image Compression With Discretized Gaussian Mixture Likelihoods and Attention Modules", Proceedings of the IEEE/CVF Conference on Computer Vision Pattern Recognition, Mar. 2020, p. 7936-7945, ArXiv Preprint ArXiv:2001.01568v3, Mar. 30, 2020.
Duan et al. "Video Coding for Machines: A Paradigm of Collaborative Compression and Intelligent Analytics", IEEE Transactions on Image Processing, 29: 8680-8695, 2020, ArXiv Preprint ArXiv:2001.03569v2, 15 P., Jan. 13, 2020.
Kalsotra et al. "Background Subtraction for Moving Object Detection: Explorations of Recent Developments and Challenges", The Visual Computer—International Journal of Computer Graphics, 38(12): 4151-4178, Published Online Aug. 16, 2021.
Karras et al. "Flickr-Faces-HQ Dataset (FFHQ)", Wayback Machine, Github, 12 P., Apr. 16, 2022.
Lan et al. "What Is Semantic Communication? A View on Conveying Meaning in the Era of Machine Intelligence", Journal of Communications and Information Networks, XP093061437, 6(4): 336-371, Dec. 24, 2021.
Li "Labelled Faces iin the Wild (LFW) Dataset. Over 13,000 Images of Faces Collected From the Web", Kaggle, 1 P., Jan. 4, 2022.
Li et al. "Toward a Practical Perceptual Video Quality Metric", Netflix Technology Blog, 20 P., Jun. 6, 2016.
Liu et al. "Guest Editorial Introduction to Special Section on Learning-Based Image and Video Compression", IEEE Transactions on Circuits and Systems for Video Technology, 30(7): 1785-1788, Jul. 2020.
Löhdefink et al. "Focussing Learned Image Compression to Semantic Classes for V2X Applications", 2020 IEEE Intelligent Vehicles Symposium (IV), XP033872794, Las Vegas, NV, USA, Oct. 20-23, 2020, p. 1641-1648, Oct. 20, 2020.
Minnen et al. "Joint Autoregressive and Hierarchical Priors for Learned Image Compression", Advances in Neural Information Processing Systems, NIPS 2018, Montreal, Canada, 2018, p. 10794-10803, ArXiv Preprint ArXiv:1809.02736v1, Sep. 8, 2018.
Wu et al. "Detectron2", Facebook AI Research, Github, 6 P., Apr. 9, 2022.
Xue et al. "Video Enhancement With Task-Oriented Flow", International Journal of Computer Vision, IJCV 2019, Nov. 2019, p. 1106-1125, ArXiv Preprint ArXiv:1711.09078v3, 20 P., Nov. 10, 2019.

* cited by examiner

IMAGE DATA COMPRESSION METHOD AND DEVICE USING SEGMENTATION AND CLASSIFICATION

RELATED APPLICATIONS

This application is a National Phase of PCT Patent Application No. PCT/IB2023/054014 having International filing date of Apr. 19, 2023, which claims the benefit of priority of Portugal Patent Application No. 117915 filed on Apr. 19, 2022. The contents of the above applications are all incorporated by reference as if fully set forth herein in their entirety.

FIELD AND BACKGROUND OF THE INVENTION

The present disclosure relates to an image and video compression method and device using region identification and segmentation, with region classification and learning-based encoding according to region classification.

Advanced video applications in smart environments (e.g., smart cities) bring different challenges associated with increasingly intelligent systems and demanding requirements in emerging fields such as urban surveillance, computer vision in industry, medicine, and others. As a consequence, a huge amount of visual data is captured to be analysed by task-algorithm driven machines. Learning approaches for image and video compression have been increasingly investigated in the recent past with the aim of developing alternative coding schemes to the current hybrid encoders [1]. Two different approaches have been under research: either including additional learning-based models and coding tools and/or substituting existing ones in conventional hybrid block-based encoders or developing end-to-end learning-based compression architectures using deep neural networks to find a whole compact representation of the visual content.

In the recent past, end-to-end learning-based image compression has been proposed in the literature, attempting to achieve higher coding efficiency than conventional hybrid encoders [2]. Learning structures such as variational auto-encoders (VAE) are among those with more competitive performance in comparison hybrid encoding schemes [3], [4].

Typically, the end-to-end structure of an autoencoder (AE) is comprised of a pipeline of convolutional layers and activation layers, forming an encoder, which generates a latent representation of the input image with reduced dimensionality, followed by a quantization function, entropy coder and then the decoding counterpart. Compression is achieved by generating a latent representation with reduced size followed by entropy coding. The VAEs achieve improved coding efficiency by imposing a normal distribution on the latent representation which ensures its regularisation.

When a learning-based image/video compression architecture is optimised for the human visual system, the aim is to jointly minimise the entropy and some perceptually-driven distortion measure thus, maximising the compression ratio for any given quality level. However, when the visual information is to be delivered for machine vision tasks, the learning objective is no longer to minimise a perceptual metrics but rather a task performance metric [5], [6], e.g., precision of object classification, recognition, etc.

This is the case of smart surveillance systems, where images/video are captured, compressed, and delivered for intelligent analysis of scenes comprising different visual objects.

Document U.S. Pat. No. 11,263,261 B2 discloses a division of each image in different regions and classifies each region according to their characteristics. However, one single conventional hybrid encoder is used for all regions, i.e., following standard MPEG-like architectures such as H.264, HEVC and VVC. A different parameter set is used to encode each class. These are external/configuration parameters which actually do not change the encoding structure neither its functions.

Document U.S. Pat. No. 9,215,467 B2 discloses a division of the images into regions of interest and selects encoding parameter sets according to each region and intermediate outputs of a video analytics process. The aim is to achieve higher fidelity in specific regions of surveillance images in order to allow non-relevant regions to be encoded with less bit rate and by doing this, the overall bit rate is reduced. They use a conventional hybrid encoder, i.e., standard MPEG-like architectures such as H.264, HEVC and VVC.

Document U.S. Pat. No. 10,936,907 B2 discloses an object detection in maritime applications generating a heat map. This can be cited as an example of meaningful regions in maritime applications.

Document U.S. Pat. No. 11,259,040 B1 discloses devices and methods for adaptive multi-pass risk-based video encoding.

Document WO 2020091872 A1 discloses systems and methods for saliency-based video compression.

Document U.S. 2022094928 A1 discloses a machine learning based approach for fast multi-rate encoding.

These facts are disclosed in order to illustrate the technical problem addressed by the present disclosure.

SUMMARY OF THE INVENTION

It is disclosed an image data compression method using segmentation and classification, comprising the steps of: identifying regions in a received image comprised of image pixels; segmenting the image pixels into segmented regions, each segmented region corresponding to an identified region, and, optionally, into an image background comprised of image pixels, if existing, not belonging to any of the identified regions, i.e. if the segmented regions do not cover the totality of the received image; determining a class for each segmented image region from a plurality of predetermined image classification classes; applying an image learning-based encoder to each segmented image region, according to the determined class of each segmented image region, wherein a specific image learning-based encoder has been preselected for each of the image classification classes from a prebuilt library of image learning-based encoders which have been each pretrained with images of the respective preselected class; outputting the encoded segmented image regions.

In an embodiment, the identified regions are: square or rectangular image regions; image regions defined by their graphical image properties; or image regions defined by their content as identified by a previously trained content detector.

The identified regions may cover, or not, the complete image to be compressed.

The identified regions may be defined by their graphical image properties which comprise image regions defined by their graphical image properties comprising variance, horizontal and/or vertical gradient, Local Binary Patterns, DCT, KLT and/or Fourier transform, including combinations thereof.

In an embodiment, the identified regions are selected from a combination of: square or rectangular image regions; image regions defined by their graphical image properties; and image regions defined by their content as identified by a previously trained content detector.

In an embodiment, the segmented regions defined by their graphical image properties, or defined by their content as identified by a previously trained content detector, of an arbitrary shape defined by a binary mask within a square or rectangular bounding box.

In an embodiment, the class determination is partially or fully inherited from the region identification.

In an embodiment, the class is determined from the signal characteristics given by variance, horizontal and/or vertical gradients, Local Binary Patterns, DCT, KLT and/or Fourier transforms, including combinations thereof, of the image region being classified.

In an embodiment, the identified regions are hierarchical, each identified region comprising zero, one or more identified sub-regions, said identified sub-regions, after having been identified and segmented, being processed as an identified region.

In an embodiment, the segmented regions are non-overlapping image regions.

In an embodiment, the segmented regions are non-uniform in size and shape.

In an embodiment, the spatial resolution of each identified region is adapted according to the library of image learning-based encoders being used.

In an embodiment, the library of image learning-based encoders is a library of convolutional neural network, CNN, autoencoders.

In an embodiment, an autoencoder comprises a pipeline of convolutional layers and activation layers, forming an encoder, for generating a latent representation of an input with reduced dimensionality, followed by a quantization function, entropy coder and then a decoder counterpart, trained for reconstructing a minimum-distorted version of input from the latent representation.

An embodiment comprises identifying regions in the received image by using object-detecting learning-based full-image networks, in particular Yolo or Detectron2 networks.

An embodiment comprises applying a convention hybrid encoder to the image background, in particular a MPEG-like encoder, such as H.264, HEVC or VVC.

An embodiment comprises the application of a centring step to each segmented region, after the image pixels have been segmented into each segmented region.

In an embodiment, the image classification classes are defined as people, faces, bags, boxes, backpacks, or carry-on items, or combinations thereof, corresponding to image regions classified as being image regions containing visual objects termed as semantic content, for example an image of a person or of a person's face, respectively.

An embodiment comprises pretraining the library of image learning-based encoders using datasets of images containing regions of the same class as the preselected image classification class for each encoder.

It is also disclosed a device for compressing image data by segmentation and classification image processing, comprising an electronic data processor configured to carry out the steps of: identifying regions in a received image comprised of image pixels; segmenting the image pixels into segmented regions, each segmented region corresponding to an identified region, and into an image background comprised of image pixels, if existing, not belonging to any of the identified regions i.e. if the segmented regions do not cover the totality of the received image; determining a class for each segmented image region from a plurality of predetermined image classification classes; applying an image learning-based encoder to each segmented image region, according to the determined class of each segmented image region, wherein a specific image learning-based encoder has been preselected for each of the image classification classes from a prebuilt library of image learning-based encoders which have been each pretrained with images of the respective preselected class; outputting the encoded segmented image regions.

It is also disclosed a computer-readable medium comprising program instructions that when executed by an electronic data processor cause it to carry out any of the disclosed method embodiments.

It is also disclosed a computer program comprising program instructions that when executed by an electronic data processor cause it to carry out any of the disclosed methods.

BRIEF DESCRIPTION OF SEVERAL VIEWS OF THE DRAWINGS

The following figures provide preferred embodiments for illustrating the disclosure and should not be seen as limiting the scope of invention.

DESCRIPTION OF SPECIFIC EMBODIMENTS OF THE INVENTION

In the present document, it is disclosed an encoder comprising a region identifier, operating in the incoming pictures, followed by a region classifier and then multiple learning-based encoders, each one used for compression of single-class regions.

In an embodiment, the bit streams produced by each encoder are multiplexed into a single coded stream which conveys the information of a whole image, i.e., all regions, or sequence of images in case of video.

In an embodiment, different types of regions are identified, according to image content (which could be termed as semantic content) and shape: (i) square/rectangular regions of different sizes with either agnostic or semantically meaningful content; (ii) regions with arbitrary shapes defined by a binary mask located inside a square/rectangular bounding box.

In an embodiment the spatial/temporal resolution of each identified region is adjusted according to the requirements of the learning-based encoder.

In an embodiment, the classifier assigns one single class, selected among a set of predefined classes, to each region.

In an embodiment, an independent encoder is assigned to each class and used to compress the data of corresponding region.

In an embodiment, each encoder is comprised of a deep learning network architecture, not necessarily equal for all of them.

In an embodiment, each encoder-decoder pair learns how to efficiently encode the regions of each class through an offline end-to-end training process, using datasets of images or sub-images exclusively from that particular class.

In an embodiment, signalling information is included in the multiplexed coded stream to allow region composition and image reconstruction at the decoder side.

In an embodiment, there is an individual encoder for each class, each one may have a different processing architecture and each one is optimised specifically for each class by learning the optimum network parameters through machine learning.

The present document also discloses a method for treating video signals as sequences of independent frames with arbitrary temporal distances between them. The identified regions from each image are classified into one of the K predefined classes of interest, which depend on the requirements of a surveillance scenario. For each class an end-to-end optimised encoder is used to obtain its compressed representation for transmission to the corresponding decoder and processing through the corresponding machine vision task.

In an embodiment, a machine vision task is object classification into persons and faces.

Figure 1:
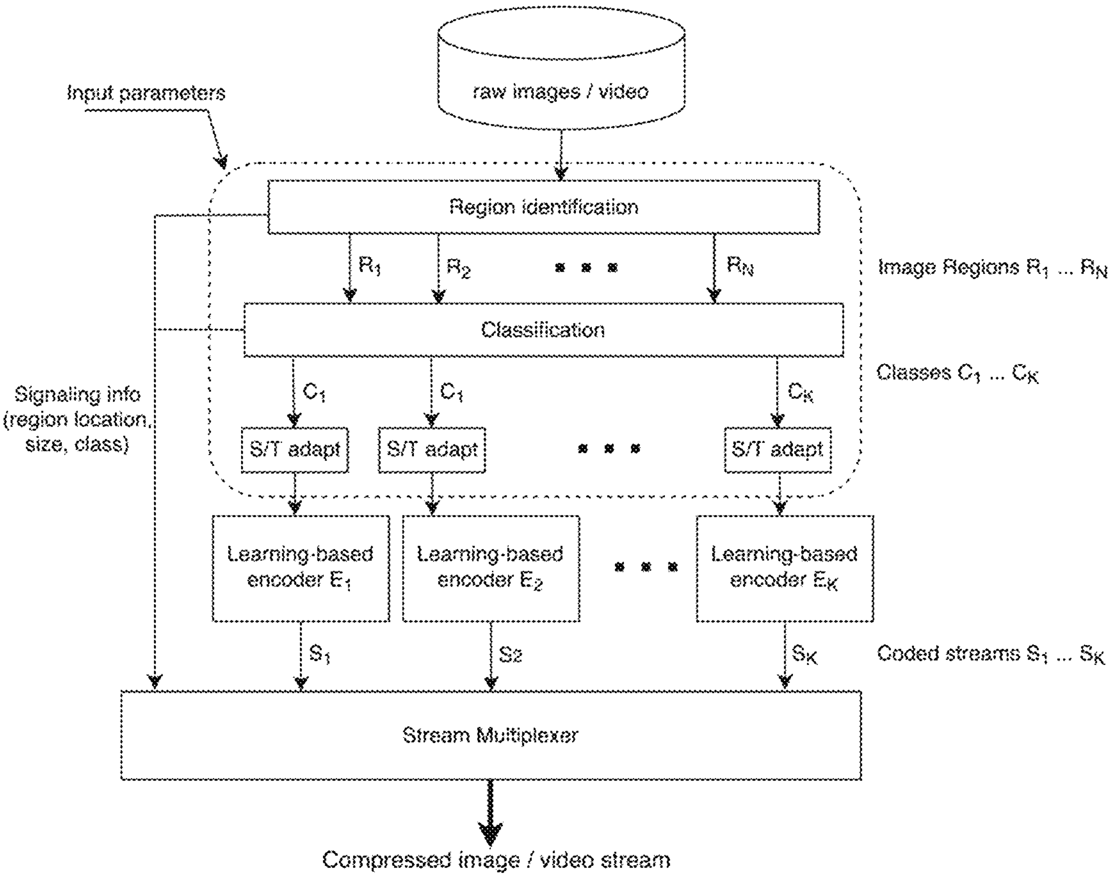
FIG. 1: Schematic representation of an embodiment of a compression method using multiple region-based encoders.

FIG. 1 shows a schematic representation of an embodiment of a compression method using multiple region-based encoders.

The encoding system operates in two distinct modes: (i) training mode; and (ii) compression mode.

In the training mode, each end-to-end codec is fed with image regions of the same class, optimising all network parameters to achieve the best possible decoded images at the lowest rate. Thus, each codec is specifically optimised for each class of regions.

In the compression mode, each optimised encoder operates as image compression engine, producing a coded stream to be either delivered through communication networks or stored in a server. The optimised decoders operate at the end of the delivery chain or storage server to decompress the coded streams and reconstruct the corresponding image regions.

The region identification module identifies different types of regions, either based on user-defined parameters or automatic region identification algorithms.

In an embodiment, the regions are characterized according to their recognizable-object image content, which could be termed as semantic content.

Agnostic regions are groups of pixels without recognizable objects, i.e. without any specific meaning for humans, so their visual content/information cannot be interpreted by the human visual system, as approximated by object-recognition image processing. In contrast, regions with recognizable objects, i.e. with semantic content, are comprised of pixels representing visual objects that can be recognised by the human visual system and also regions defined in any image modality that represent any other type of visual information possible to be interpreted by humans, as approximated by object-recognition image processing.

In an embodiment, the images are medical images of type CT, PET, MRI, HREM, LSFM, WSI, depth maps computationally extracted from multiview images or captured by specific technology, e.g. ToF, Infra-Red, thermal and multispectral images or combinations of these.

Figure 2A:
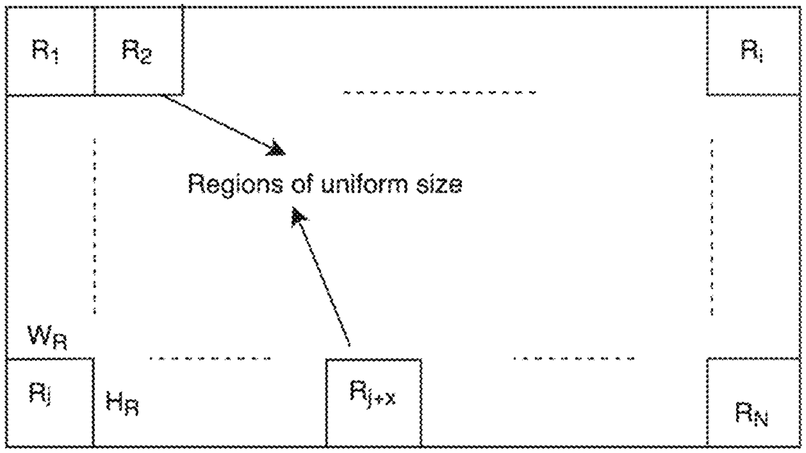
FIG. 2A: Schematic representation of an embodiment of a region of type 1.

FIG. 2A shows a schematic representation of an embodiment of a region of type 1, wherein WR stands for width and HR for height. The image comprises rectangular/square regions of uniform size, i.e., non-overlapping tiles of the same size.

Regions of type 1 are identified by the square/rectangular dimensions based on a predefined set of parameters S1={WR, HR}, such that an integer number of regions is defined within the whole image. Possible examples of such regions are squares of size 128×128, 256×256, 64×64, 256×128, 128×64 pixels or any other sizes, non-power of two. The visual content of these regions is agnostic in regard to their semantic meaning.

Figure 2B:
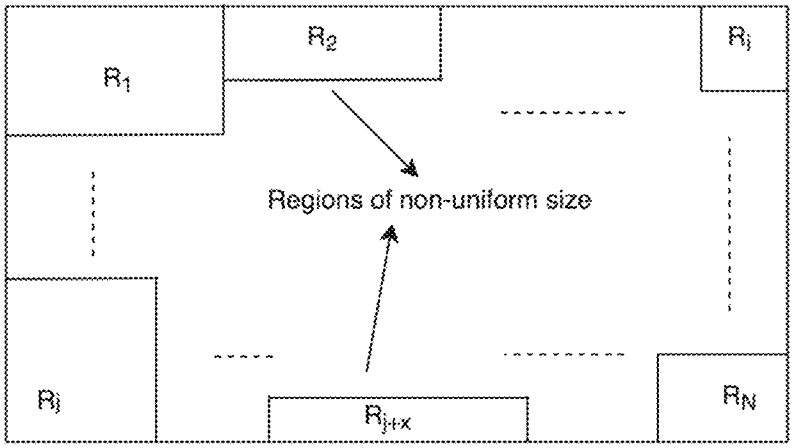
FIG. 2B: Schematic representation of an embodiment of a region of type 2.

FIG. 2B shows a schematic representation of an embodiment of a region of type 2. The image comprises rectangular/square regions of non-uniform size, i.e., non-uniform, non-overlapping tiles without semantic meaning.

Regions of type 2 are identified based on a pixel-clustering approach. Their visual content is either agnostic or not, in regard to the semantic meaning. A predefined number of different regions to be identified (K) may be used as input parameter, but not necessarily so. An unsupervised clustering algorithm may find the K on its own, based on different kinds of pixel-based or transform-based features, such as local variances, local gradients, PCA, etc.

Figure 2C:
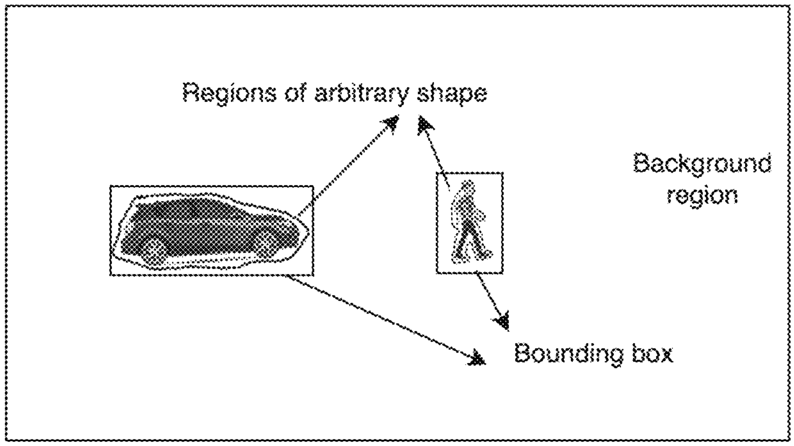
FIG. 2C: Schematic representation of an embodiment of a region of type 3.

FIG. 2C shows a schematic representation of an embodiment of a region of type 3. The image with regions of arbitrary shape, visual objects with semantic meaning, bounding boxes and background region.

Regions of type 3 are defined by bounding boxes containing recognizable visual objects, i.e. with semantic meaning, as approximated by object-recognition image processing. These are identified through automatic object detection algorithms, including learning-based networks, such as Yolo, Detectron2, which produce the bounding boxes for K possible different visual objects. The background region comprises the whole complementary region of the image, i.e., all pixels not belonging to bounding boxes.

Each identified region is assigned to one class $C_i \in C$, with $C=\{C_1, \ldots C_K\}$. The set C of possible classes is predetermined in the system design parameters, according to the application.

In an embodiment, the classification is partially or totally inherited from the region identification block, for the case of regions of type 2 and type 3. In the case of regions of type 1, classification is based on based on different kinds of pixel-based or transform-based features, such as local variances, local gradients, transforms, PCA, etc.

Regions of type 1 and 2 may be classified as follows and grouped, according to the contents' characteristics (features) and each group coded using the same learning-based encoder. For a set a F features or group of features (e.g., variance, total gradient, horizontal gradient, vertical gradient, transform coefficients), each one of them divided in M intervals, the total number of classes (K) to be considered is $$K=M^F$$

which, accordingly, defines the number of different codecs to be used.

Spatial-temporal adaptation (S/T adapt) can be used as required, which is either down sampling or up sampling of the regions previously identified, with the objective of matching the input dimensions required by each of the corresponding encoders.

In more detail, region classification can be based on the signal variance of the image region.

One possible criterion to classify image regions identified as squares/rectangles is the variance of such regions, calculated as follows:

$$\mathrm{var}(R_L) = \frac{\sum_r^C \sum_{i=1}^{H_L} \sum_{j=1}^{W_L} (X_{kij} - \mu_r)^2}{H_L * W_L * C}$$

where C represents the number of channels of the image (e.g., 3 in the case of RGB), $\mu_r$ represents the mean of channel r, $X_{kij}$ represents the value of the pixel (i,j) in channel rand $H_L$, $W_L$ represent the height and the width of region L.

A predefined number of classes (K) is established based on variance intervals defined within the range [0, $\mathrm{var}_{MAX}$], where varMax is the upper bound of the variance that can be computed for each image. An arbitrary class Ci is defined by any variance interval such that $Th_{i-1}<\mathrm{var}<Th_i$ with i=1 . . . K and $Th_0=0$, $Th_k=\mathrm{var}_{MAX}$ A region RL is classified into class Ci (i.e., $R_L \rightarrow C_i$) according to the following rule:

IF $Th_{i-1}<\mathrm{var}(R_L)<Th_i$ THEN $R_L \rightarrow C_i$

In more detail, region classification can be based on gradients present in the image regions.

One possible criterion to classify image regions identified as squares/rectangles is the gradient vectors of such regions, calculated as follows:

Using the convolution operation with a two-dimensional kernel, different methods can be used to calculate the gradients of an arbitrary image region, such as Sobel, Scharr, Prewitt, Roberts, Canny and Laplacian methods. The gradient components of an arbitrary region $R_L$, in the horizontal and vertical directions, are denoted by $G_x$ and $G_y$, respectively, A predefined number of classes (K) is established based on two-dimensional gradient intervals defined within the range $G_x \in [0, Gx_{MAX}]$ and $G_y \in [0, Gy_{MAX}]$ where $Gx_{MAX}$ and $Gy_{MAX}$ are upper bounds of the horizontal and vertical gradients, respectively. These can be computed either for each image or subimage. An arbitrary class Ci is defined by any two gradient intervals such that $Th_{i-1}<G_x<Th_i$ and $Th_{j-1}<G_y<Th_j$ with i=0 . . . P, j=0 . . . Q, P×Q=K and $Th_0=0$, $Th_P=Gx_{MAX}$, $Th_Q=Gy_{MAX}$ A region RL is classified into class Cij (i.e., $R_L \rightarrow C_{ij}$) according to the following rule:

IF $Th_{i-1}<Gx(R_L)<Th_i$ AND $Th_{j-1}<Gy(R_L)<Th_j$ THEN $R_L \rightarrow C_{ij}$ In more detail, region classification can be based on transforms applied to the image regions.

One possible criterion to classify image regions identified as squares/rectangles is the transform coefficients of such regions, calculated as the Fourier transform, Local Binary Patterns, DCT, KLT/PCA of a region $R_L$. Using any of these transforms, the computed coefficients of a region $R_L$ is a matrix $T_L$ with the same dimensions as $R_L$. The matrix $T_L$ is divided into N submatrices (i.e., subbands) not necessarily of equal size and for each one the energy of its coefficients is computed giving rise to the set $E_L=\{E_{L,1}, E_{L,2} \ldots E_{L,N}\}$ A predefined number of classes (K) is established based on the M<=N submatrices with the greatest energy values in $E_L$, i.e., each one above a corresponding predefined threshold $Th_j$.

A region RL is classified into class Ci (i.e., $R_L \rightarrow C_i$) according to the following rule:

IF(for j=1 . . . M,$E_{L,j}>Th_j$)THEN $R_L \rightarrow C_i$

Figure 3:
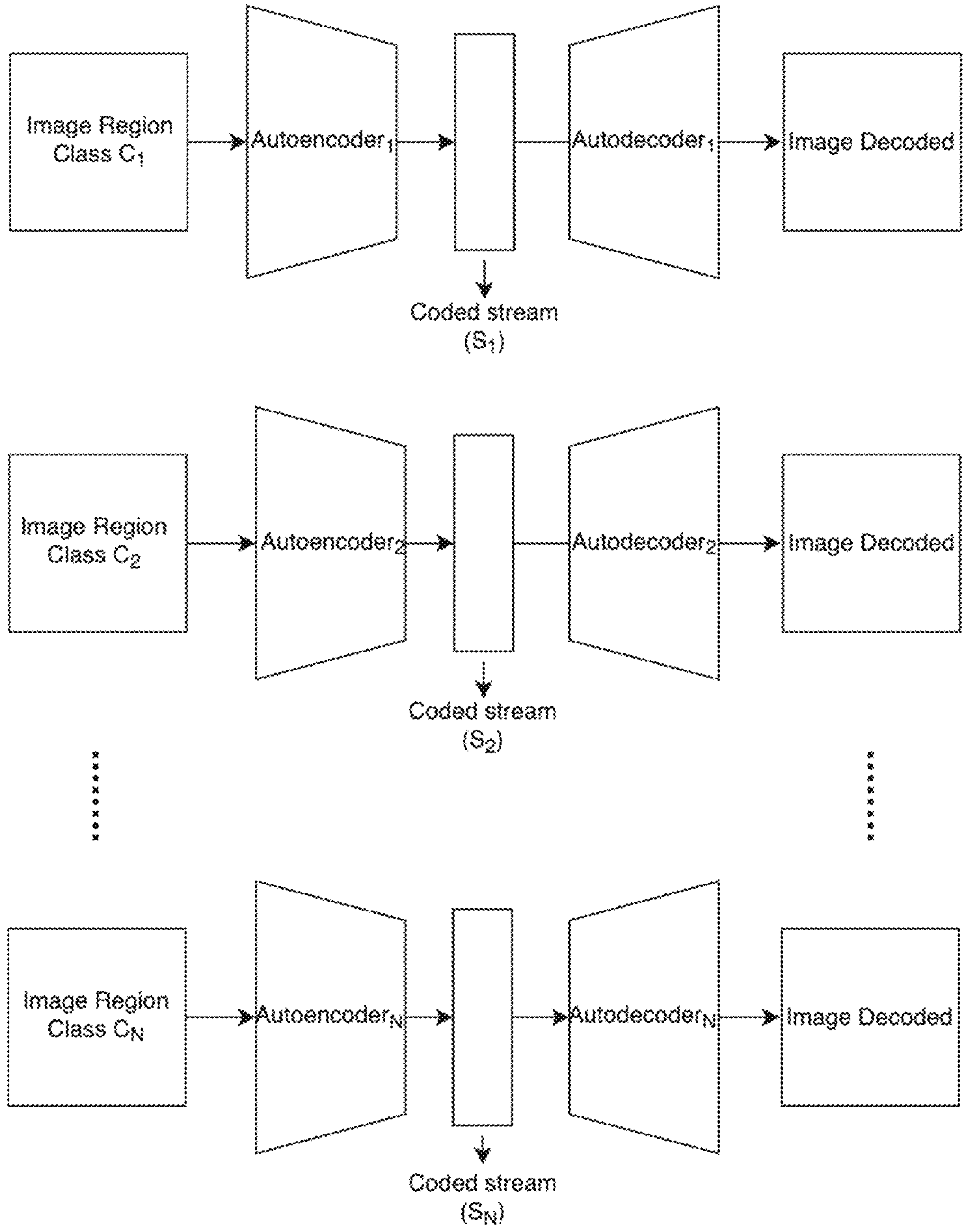
FIG. 3: Schematic representation of an embodiment of the learning-based codecs using one specific autoencoder to compress the data of regions of each class and corresponding decoder.

FIG. 3 shows a schematic representation of an embodiment of the learning-based codecs using one specific autoencoder to compress the data of regions each class and corresponding decoder.

Figure 5:
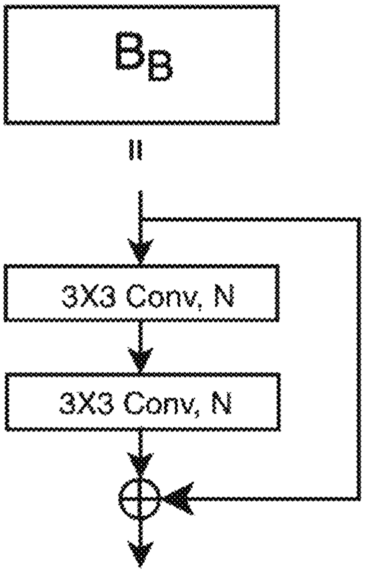
FIG. 5: Schematic representation of an embodiment of a residual block, which consists on two convolutional layers with a sum of the input information in the block. It is used to increase large receptive field and improve the rate-distortion performance.

The learning-based encoders are specific encoding structures, typically a variational autoencoder, designed and optimised for compression of each class. The high-level learning based end-to-end codec system is depicted in FIG. 5. The encoder and decoder are deep-learning networks jointly trained to encode image regions of a single class. This is an end-to-end optimisation process using K datasets with thousands or millions of images of the same class, used to learn the optimal parameters of the deep learning network that achieve the best compression efficiency for each class. After training the end-to-end network, i.e., encoder and decoder, for each class, these are used separately at the end-points of the delivery/communication system—each encoder produces its own stream while the corresponding decoder reconstructs the corresponding image regions.

Each encoder-decoder pair is optimised for a unique object class by training the convolutional neural networks (CNNs) with visual objects of that class. Since objects of the same class have similar features, this strategy favours the network to better learn how to model those common features, thus reducing the entropy of the latent representation. At the end of the pipeline, after decoding, the visual objects are processed to by some tasks whose level of success is a measure of the system performance.

Figure 4A:
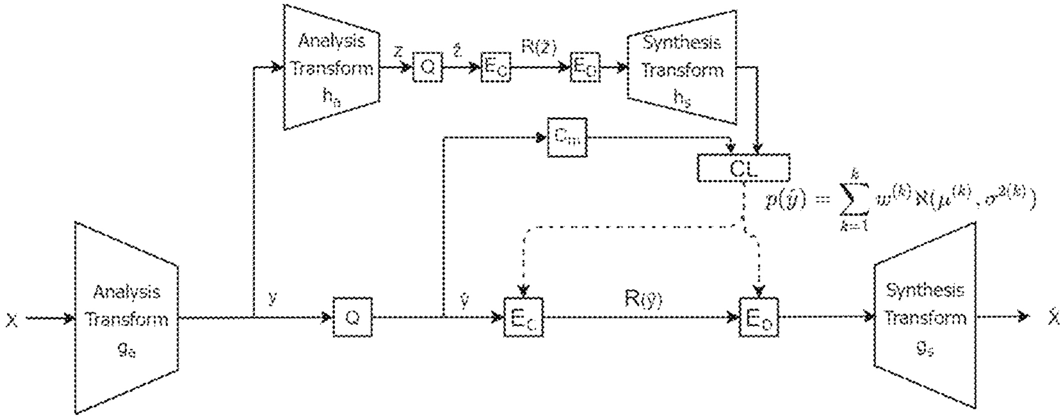
FIG. 4A: Schematic representation of an embodiment of a structure of an autoencoder used to learn and compress image data according to the disclosure.

FIG. 4A shows a schematic representation of an embodiment of a structure of an autoencoder used to learn according to the disclosure. This builds upon the structure defined in [8] where x, x^, y, y^ are the input visual objects, reconstructed objects, latent space before quantization and coded stream, respectively.

Figure 4B:
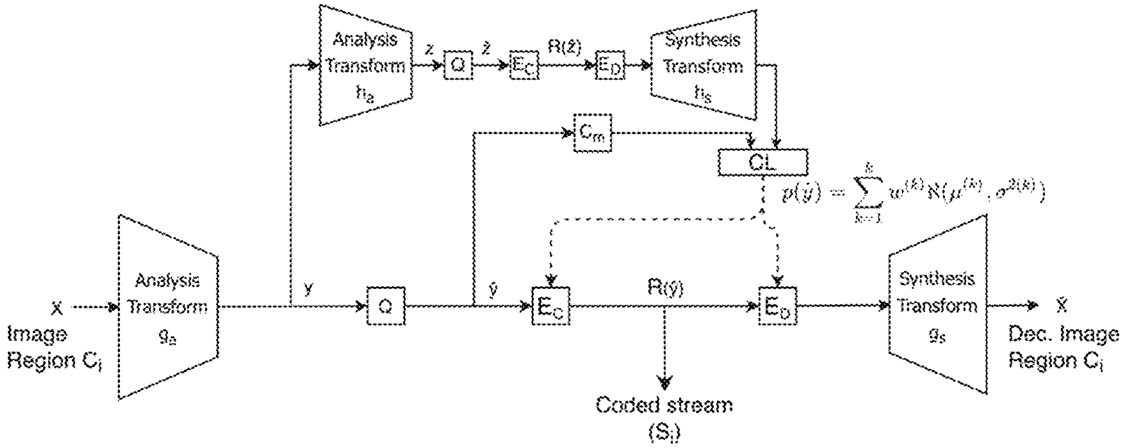
FIG. 4B: Schematic representation of an embodiment of a structure of an autoencoder used to learn and compress image data according to the disclosure, specifically showing an output of an encoded data stream.

FIG. 4B shows a schematic representation of an embodiment of a structure of an autoencoder used to learn and compress image data according to the disclosure, specifically showing an output of an encoded data stream.

Then $y=ga(x; \varphi)$; $\hat{y}=Q(y)$; $\hat{x}=gs(\hat{y}; \theta)$ represent the analysis, quantization and synthesis transforms composed by convolutional layers and activation functions. $\varphi$ and $\theta$ are the set of parameters of the analysis and synthesis transforms that are optimised during the training phase. Quantization is approximated by additive uniform noise to keep it differentiable during the training phase while in inference a rounding-based operation is used followed by entropy coding, e.g., arithmetic coding. Besides the main encoder-decoder pipeline, the auxiliary network comprised of the analysis and synthesis transforms ha and hs, respectively, provides an hyperprior by generating the side information $z=ha(y; \varphi h)$, which captures the spatial correlations of y[4]. The quantized version of z is $\hat{z}=Q(z)$ and the synthesis transform produces an estimate of distribution $p(\hat{y}/\hat{z})$, i.e., $hs(\hat{z}; \theta h) \rightarrow p(\hat{y}/\hat{z})$. The parameters $\varphi h$, $\theta h$ are jointly optimised with $\varphi$ and $\theta$ during training. A discretised Gaussian mixture is used for the entropy model [8], where each Gaussian distribution is characterised by 3 parameters, weight, mean and variance. The Gaussian mixture model requires $3 \times N \times K$ channels for the output of auxiliary autoencoder, where N represents the number of filters and K the number of mixtures. To improve the entropy coding efficiency, an autoregressive model, Cm, is used to predict each latent representation from its causal context [9]. By concatenating the output of the autoregressive model (Cm) and the output of the synthesis transform (hs) the estimated the probability distribution of $\hat{y}$ is obtained after convolutional layers CL and given to the entropy encoder and decoder. The bit rate of compressed images is given by $R=R(\hat{y})+R(\hat{z})$, where last term is side information encoding the entropy model parameters required for arithmetic decoding.

The various learning-based blocks of the auto encoder (ga, gs, ha and hs), are comprised of convolutional layers of various types and other functions, structured as networks of multiple blocks, such as those defined below. The actual network architecture used in each codec may, or may not, be the same for all of them.

FIG. 5 shows a schematic representation of an embodiment of a residual block, which consists of two convolutional layers with a sum of the input information in the block. It is used to increase large receptive field and improve the rate-distortion performance.

Figure 6:
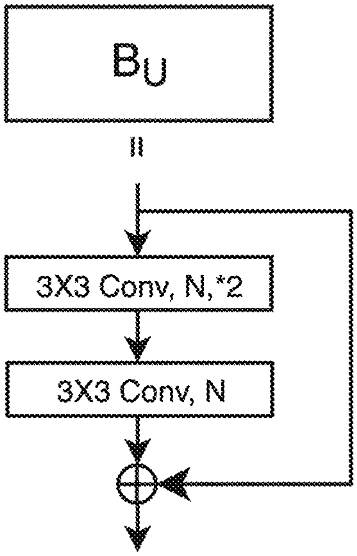
FIG. 6: Schematic representation of an embodiment of an up sample block.

FIG. 6 shows a schematic representation of an embodiment of an up sample block.

Figure 7:
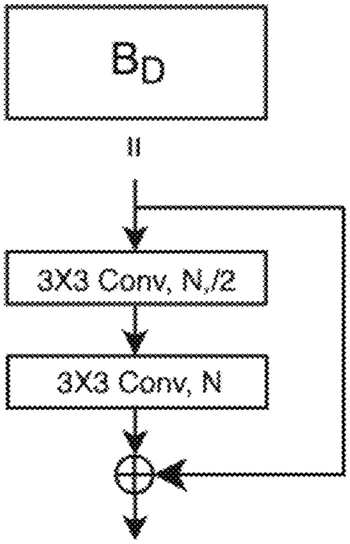
FIG. 7: Schematic representation of an embodiment of a down sample block.

FIG. 7 shows a schematic representation of an embodiment of a down sample block.

Figure 8:
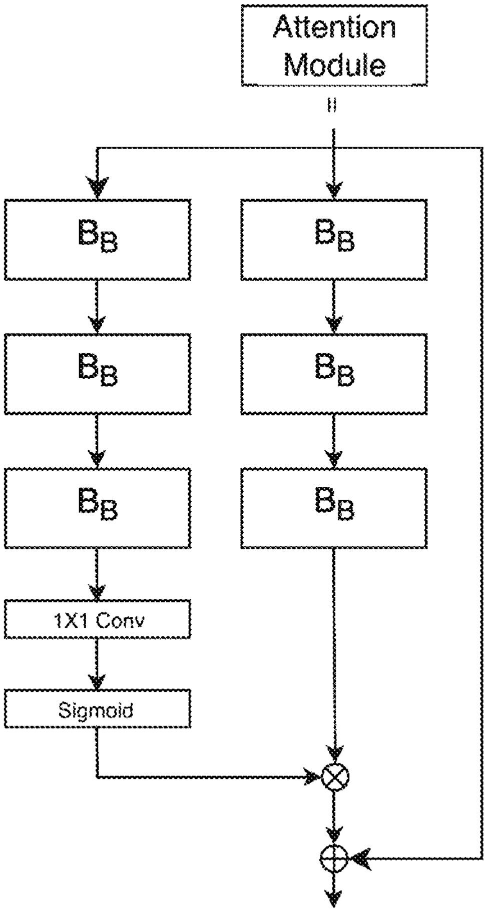
FIG. 8: Schematic representation of an embodiment of a structure of an attention module.

FIG. 8 shows a schematic representation of an embodiment of a structure of an attention module. The attention module can learn a model capable of paying more attention to more complex image regions, in order to improve coding performance with moderate training complexity. This is possible because a heavy mask is estimated that will give more importance to features that represent more complex regions. The attention module is composed by the sum of the input information with the output of the multiplication between the result of the mask and the output of convolutional layers.

Figure 9:
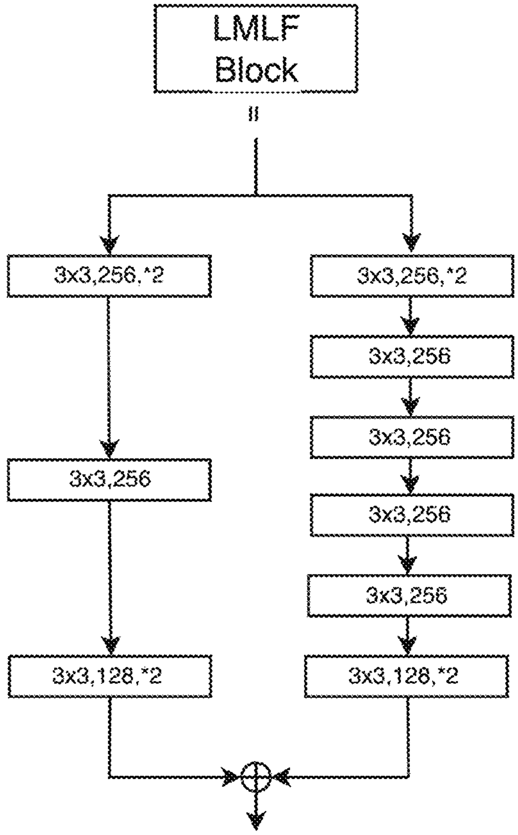
FIG. 9: Schematic representation of an embodiment of a LMLF (local multi-level feature fusion) block.

FIG. 9 shows a schematic representation of an embodiment of a LMLF (local multi-level feature fusion) block. It extracts distinct high-level and low-level features. LMLF blocks consists of two streams of the base network, a deeper base network which includes six convolutional layers, and a shallower base network which includes three convolutional layers.

Figure 10:
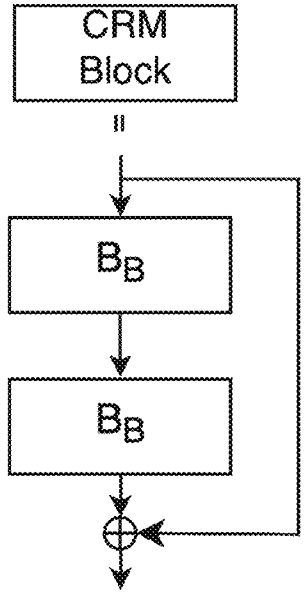
FIG. 10: Schematic representation of an embodiment of a CRM (Concatenated Residual Modules).

FIG. 10 shows a schematic representation of an embodiment of a CRM (Concatenated Residual Modules). This block can replace some residual blocks in the core encoder/decoder. It is composed of two or three residual blocks in series with an additional shortcut connection. It is useful to improve the information flow, reducing the correlation of the output, and improving the learning capability of the network.

Figure 11:
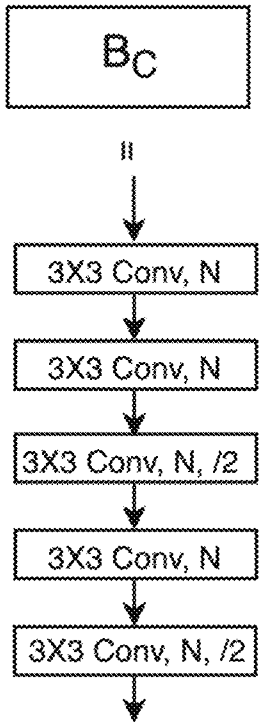
FIG. 11: Schematic representation of an embodiment of a hyper encoder.

FIG. 11 shows a schematic representation of an embodiment of a hyper encoder. Composed with some convolutional layers in series. In this case it is represented with five layers.

Figure 12:
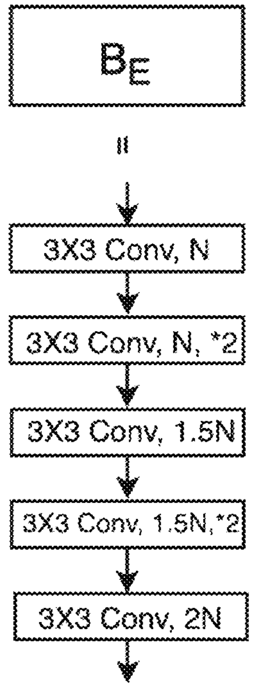
FIG. 12: Schematic representation of an embodiment of a hyper decoder.

FIG. 12 shows a schematic representation of an embodiment of a hyper decoder. Composed with some convolutional layers in series. In this case it is represented with five layers.

Figure 13:
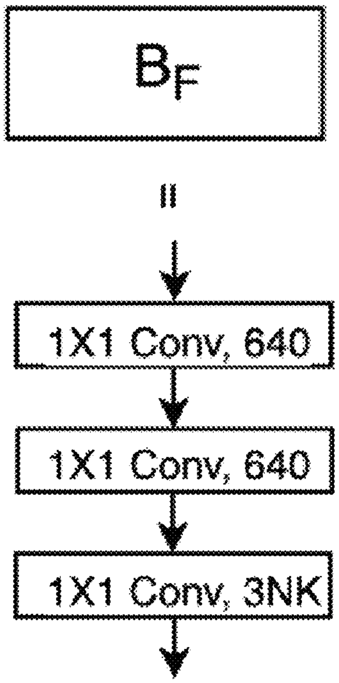
FIG. 13: Schematic representation of an embodiment of three convolutional layers.
Figure 14:
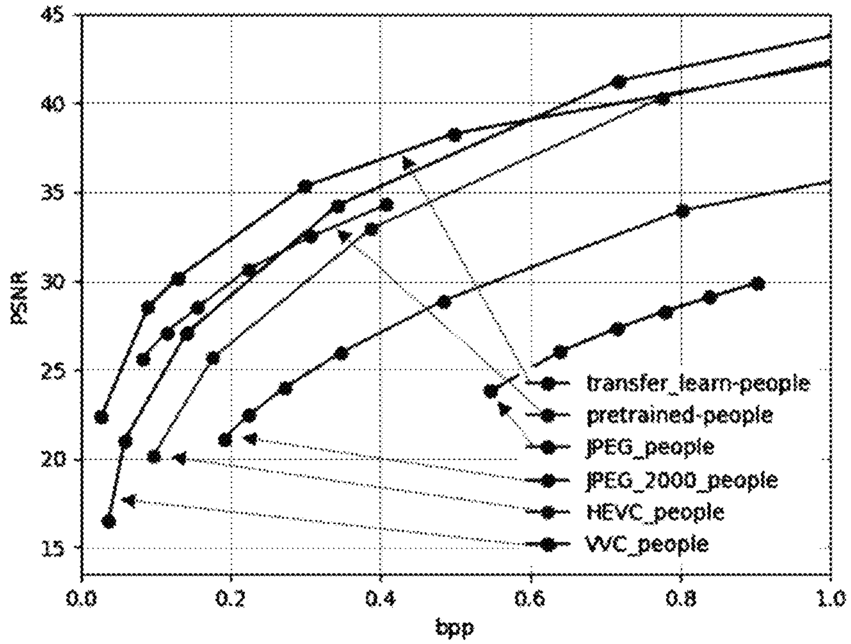
FIGS. 14-22: Results obtained.
Figure 15:
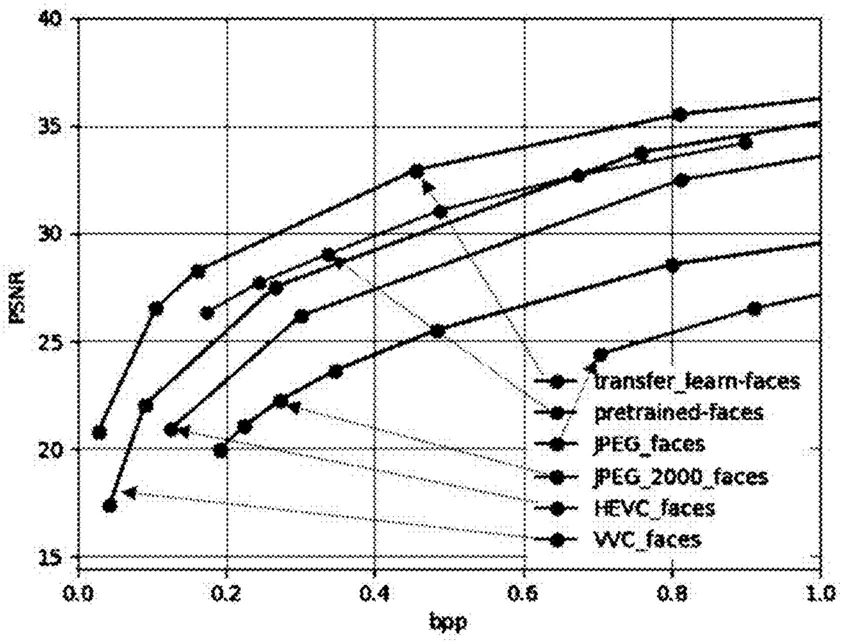
Figure 16:
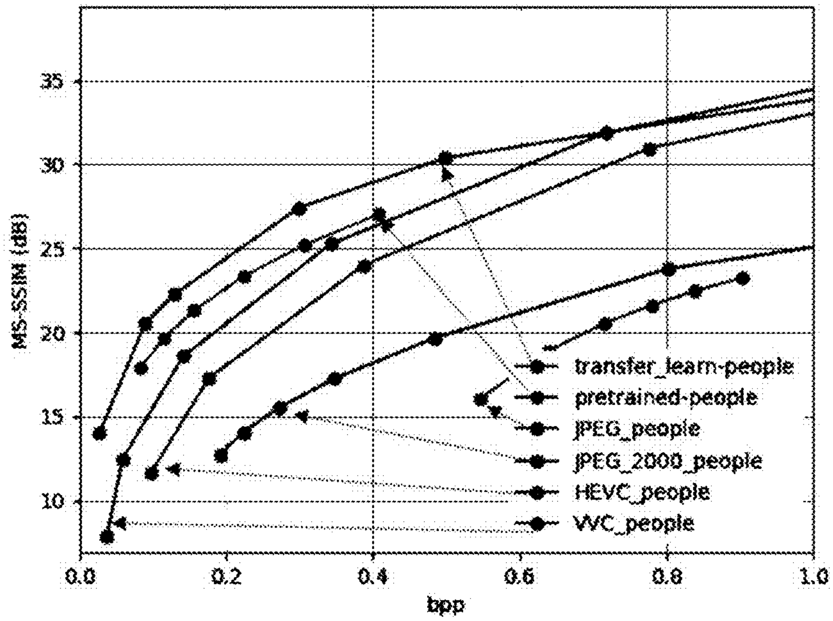
Figure 17:
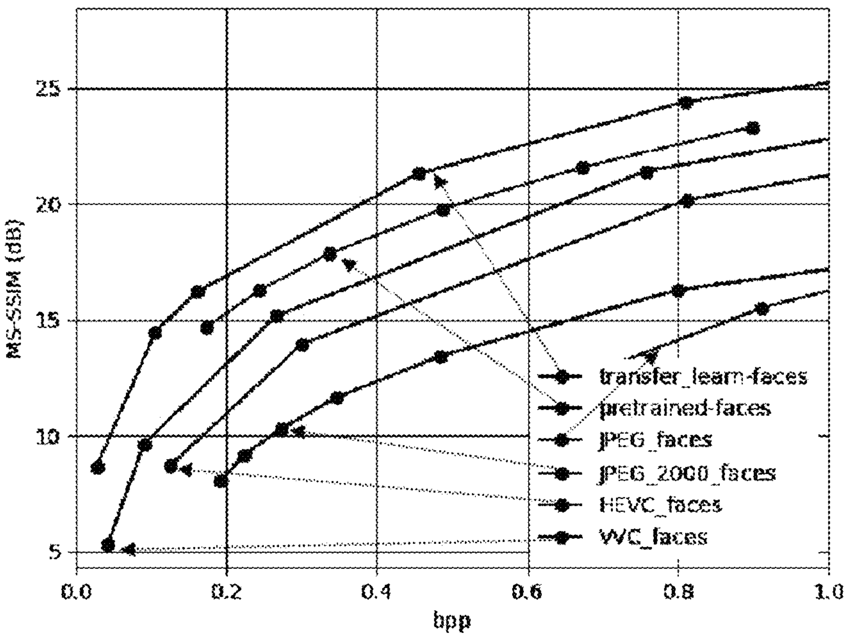
Figure 18:
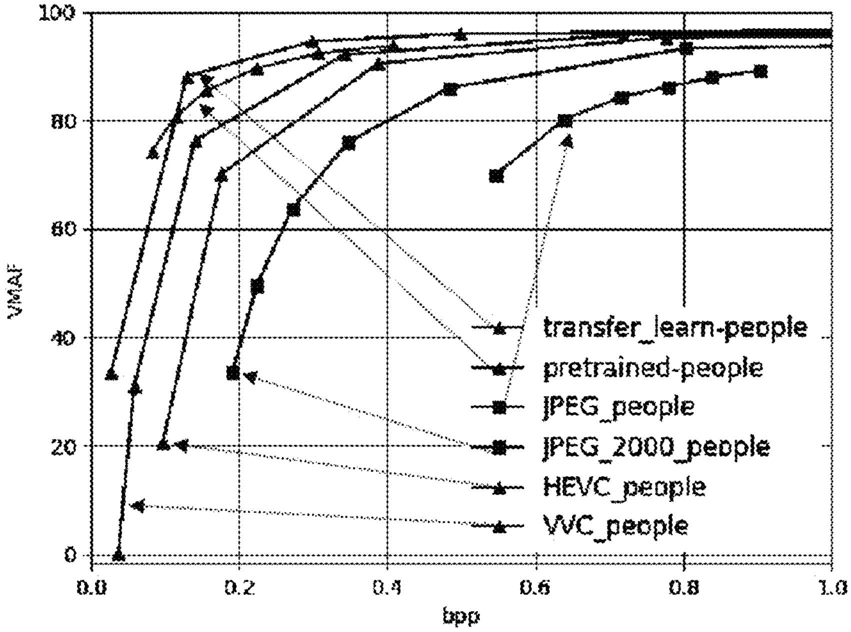
Figure 19:
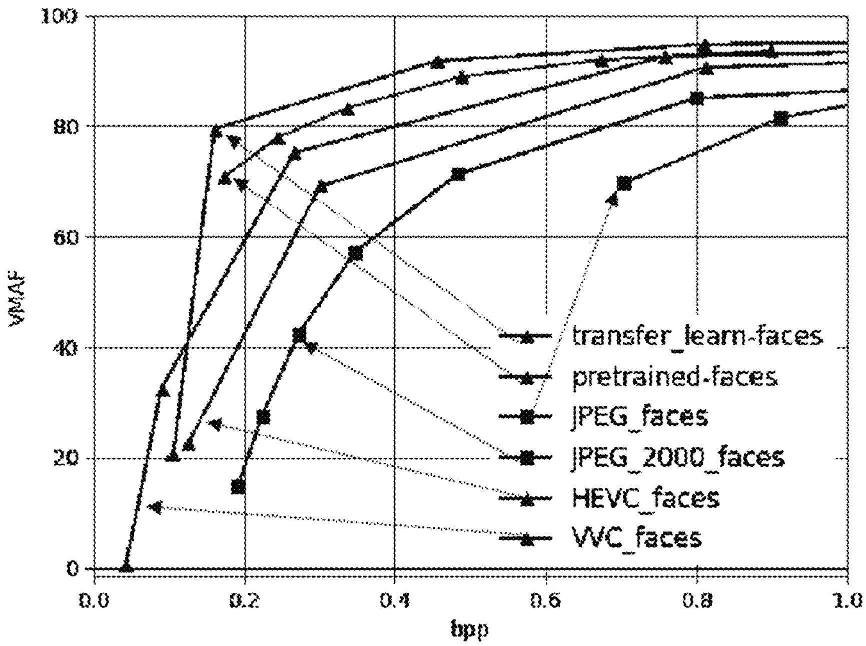
Figure 20:
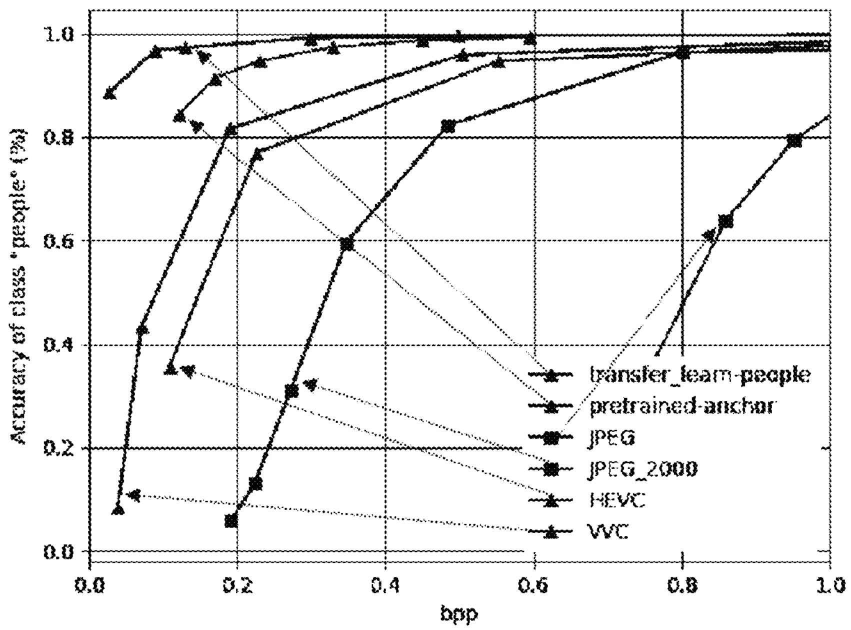
Figure 21:
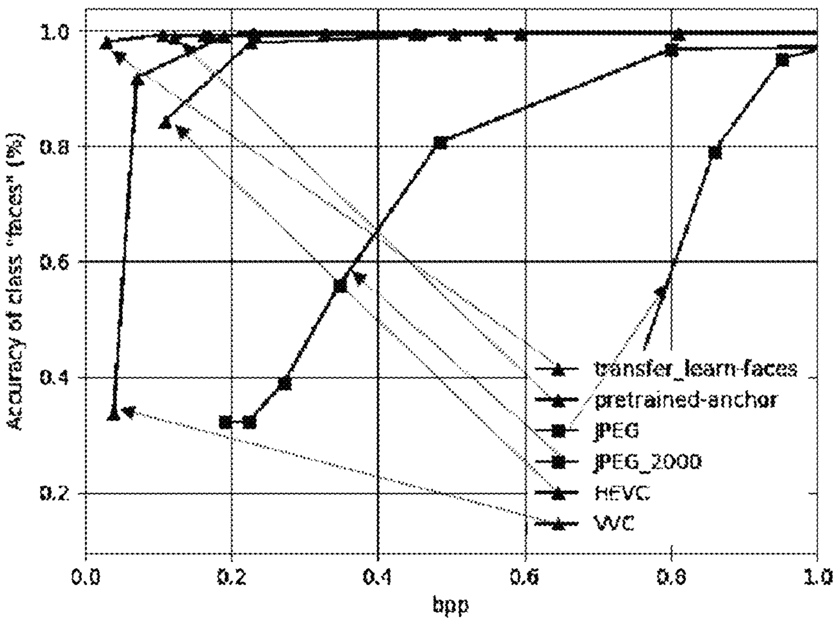
Figure 22:
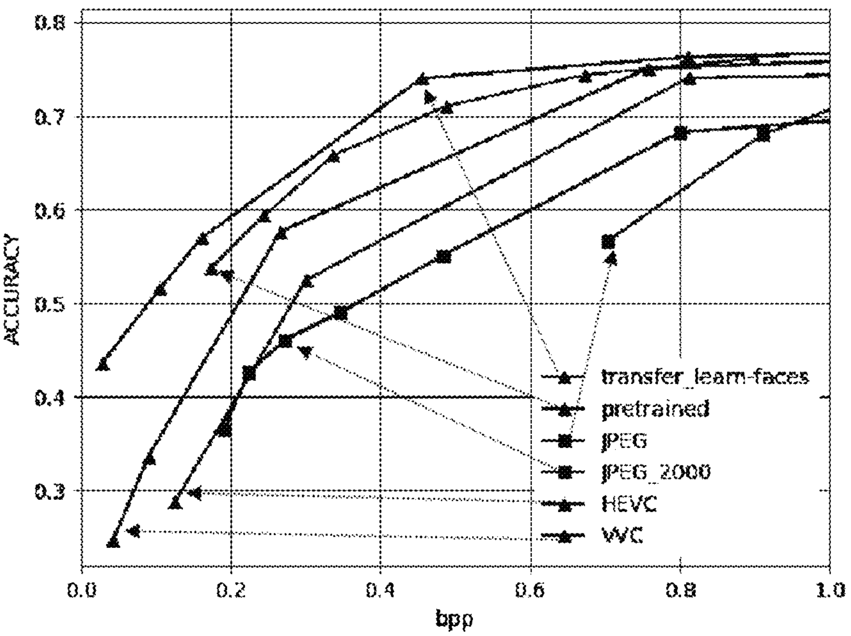

FIG. 13 shows a schematic representation of an embodiment of three convolutional layers and the output of this block is used as input of the arithmetic coder and arithmetic decoder estimating a Gaussian Mixture Distribution.

In the present document, it is disclosed an efficient learning-based method to compress relevant visual objects, captured in surveillance contexts, and delivered for machine vision processing. It is also disclosed an object-based compression scheme, comprising multiple autoencoders, each one optimised to produce an efficient latent representation of a corresponding object class.

The performance of the disclosed method was evaluated with two types of visual objects: persons and faces and two task algorithms, i.e. two computer vision tasks: class identification and object recognition, besides traditional image quality metrics like PSNR and VMAF. In comparison with the Versatile Video Coding (VVC) standard, the disclosed method achieves significantly better coding efficiency than the VVC, e.g., up to 46.7% BD-rate reduction.

The accuracy of the machine vision tasks is also significantly higher when performed over visual objects compressed with the disclosed method in comparison with the same tasks performed over the same visual objects compressed with the VVC. These results demonstrate that the learning-based method is a more efficient solution for compression of visual objects than standard encoding For the case of smart surveillance systems, it is disclosed an end-to-end compression scheme capable of achieving improved compression efficiency on predefined object classes. Assuming common surveillance images with a stationary background, and a finite number of object classes of interest, e.g., the most relevant and more likely to occur, the disclosed method exploits common features with the same object class in order to achieve latent space with lower entropy. Such coding framework follows an approach by learning the best parameters for compression of each object class rather than attempting to optimise a single end-to-end architecture for a whole image without taking into account any object classes.

The results achieved for two object classes, persons and faces, demonstrate that better coding efficiency than the VVC standard can be achieved for various quality metrics, including the performance of machine vision tasks.

The overall approach for efficient compression and delivery of visual object in smart surveillance applications is depicted in FIG. 1. It is assumed that the stationary background can be extracted through any of the available methods [7], fully encoded and sent to the decoding side using traditional encoders. For the sake of simplicity this is not represented in FIG. 1. In this work, video signals are treated as sequences of independent frames with arbitrary temporal distances between them. The relevant objects are first classified into one of the i predefined classes of interest, which depend on the requirements of the surveillance scenario. Since the background is not necessary, object segmentation is performed before encoding. Then for each class an end-to-end optimised encoder is used to obtain its compressed representation for transmission to the corresponding decoder and processing through the corresponding machine vision task. A non-exclusive example of such tasks that is used in this work is object classification into persons and faces.

Each encoder-decoder pair is optimised for a unique object class by training the convolutional neural networks (CNNs) with visual objects of that class. Since objects of the same class have similar features, this strategy favours the network to better learn how to model those common features, thus reducing the entropy of the latent representation. At the end of the pipeline, after decoding, the visual objects are processed to by some task whose level of success is a measure of the system performance.

Two datasets were considered to evaluate the disclosed compression approach using two different object classes: "people" and "faces". The "faces" dataset was created by joining the LFW Face Database and Flickr-Faces-HQ Dataset available respectively in [10] and [11]. The "people" dataset was created with the help of the tools made available in Detectron2 library [12], by cropping and resizing the bounding boxes of people in different positions, taken from several videos available online.

As mentioned before, since the background does not contribute with relevant features for the performance of object-oriented tasks neither compression performance, a segmentation step plus centering was further applied to the objects in the bounding boxes. The segmentation was also performed by using the tools available in Detectron2. The dataset with objects of class "people" has a total of 94500 images, resized to 128×128 pixels, each one containing one person (some overlaps still exist), while for class "faces" the dataset has a total of 78761 images, also resized to 128×128 pixels.

Object detection and segmentation were performed by using the following models: faster renn R 101 FPN 3× and mask ronn R 50 FPN 3×, respectively. Specific details about these models and their implementation can be found in [12].

The performance evaluation study was carried out through simulation of the disclosed pipeline by measuring the compression efficiency using two relevant visual objects in surveillance applications: people and faces. The datasets were described in the previous section. Learning-based compression was implemented using the autoencoder architecture presented in section II and proposed in [8]. The software implementation is available in the CompressAI framework [13].

The pre-trained implementations available in CompressAI were first validated by confirming that the results presented in the publications cited in the [13] are possible to replicate quite accurately. These pre-trained models were trained for 4-5M steps on 256×256 image patches randomly extracted and cropped from the Vimeo-90K dataset [14]. A batch size of 16 was used and the initial learning rate was 1e-4 for approximately 1-2M steps. The learning rate was then divided by 2 whenever the evaluation loss reaches plateau (patience of 20 epochs).

For the performance evaluation of our approach two versions of the learning network were used: (i) the pre-trained and (ii) the re-trained one, obtained through transfer learning over the pre-trained models. In this process, the parameters of the pre-trained models were first loaded and then fine-tuning was carried out by further learning the specific features of each visual object class.

For transfer learning the "people" dataset was divided in 90000 images for training and 4500 for testing, while the "faces" dataset was divided in 74822 images for training and 3939 for testing. The models were trained for 1M steps with batch size of 8, and an initial learning rate of 1e-4.

The learning rate is divided by 10 whenever the evaluation loss reaches a plateau (patience of 10). The loss function used for training is formulated as $$L = \lambda \times 2552 \times DMSE + R(1)$$

where λ controls the rate-distortion tradeoff. DMSE denotes the distortion term between the original image and decoded and R the estimated bit-rate. When optimized by MSE, λ belongs to the set {0.00008, 0.0009, 0.0018, 0.013, 0.0483, 0.8}. N is set as 128 for five lower-rate and is set as 192 for higher rate models.

These two learning-based compression networks used in the experiments are identified in Table I, including the notation used in the Figures ahead. For comparison, the same visual objects were also compressed as intra-coded images with four standard encoders: JPEG, JPEG2000, HEVC (HM) and VVC (VTM).

TABLE I learning-based image compression models used in the experiments.

| Model | Description |
|---|---|
| pretrained-<class> | pretrained model: pretrained model using "class" for testing |
| transfer_learn-<class> | transfer learning: retrained model using "class" for training and testing |

The rate-distortion performance was evaluated by measuring three different quality metrics: the PSNR, MSSIM and VMAF, against the corresponding bits per pixel (bpp) achieved after compression. The PSNR results for the "people" and "faces" datasets are shown in FIGS. 3 and 4, respectively. The coding efficiency of the standard encoders is inline with their expected relative performance, where JPEG exhibits the lowest R-D performance and VVC the highest. In regard to the learning based approaches, for the "people" dataset, the fine-tuned autoencoder (transfer-learn) outperforms the VVC and all other encoders up to 0.6 bpp, then its quality is only slightly below VVC for coding rates. However, in the case of the "faces" dataset, transfer-learning using this object class yields consistently higher R-D performance in comparison with all the remaining encoders.

In the case of agnostic learning using the pre-trained model, i.e., with no fine-tuning for each particular class, the R-D performance is quite similar to the VVC, but nevertheless slightly above for almost the whole bit rate range. Table II shows the BD-RATE(%) and BD-PSNR (dB) gains, using the VVC as reference for the disclosed learning-based model (transfer-learn). As observed in this table the coding gains are quite significant for both datasets. While for the "people"

dataset, the BD-RATE gain is 32.6% for a BD-PSNR of 2.8%, this is even higher for the "faces" dataset, i.e. 46.7% and 3.06%, respectively.

TABLE II

BD-rate and BD-PSNR using VVC as reference.

| Dataset | Model | BD-Rate (%) | BD-PSNR (dB) |
|---|---|---|---|
| People | Transfer-learn | −32,639 | 2,837 |
| Faces | Transfer-learn | −46,705 | 3,058 |

A complementary result is shown in FIGS. 5, 6, 7 and 8, using MS-SSIM and VMAF [15]. The original MS-SSIM results are converted in dB scale (−10 log 10(1-MS-SSIM)) to represent the difference clearly. These results confirm that the disclosed method achieved better performance than the VVC and also the benefits of fine-tuning the parameters learnt from generic images. Overall, for the same bit rates, the quality obtained from the transfer-learn model is consistently better than the state of the art VVC.

The task-algorithm performance was also evaluated by using two different tasks performed by known algorithms: the accuracy of object classification and face recognition, for the same range of coding rates used before, i.e., up to 1.0 bpp.

These tasks were performed by the algorithms available in Detectron2 library.

Object classification: The same classification algorithm presented in section section III, (Detectron2) was used to evaluate the classification accuracy of visual objects, before and after encoding by the various encoders. Since the actual object class is known in advance, the result of this task is a binary output, indicating whether the correct class was identified.

This is the class associated with the highest confidence score, eliminating all possible classes with a value less than 70%, i.e., if such class is the same as the candidate object, then the object is considered correctly detected. The accuracy, measured as the percentage of objects correctly classified, is shown in FIGS. 9 and 10. The same test data was used for all encoders. For both datasets, the performance of the transfer-learn autoencoder is better than the others, particularly at lower bit rates. In the case of faces, the accuracy is quite high from very low bit rates.

This is likely because the shape of all faces are quite similar and the object detection algorithm is capable of identifying a face object from its shape, regardless the quality of the corresponding features. In the case of "people" dataset this is not likely to happen because the diversity of shapes is much higher.

Face recognition: Face recognition was performed by using the Deepface tool created by Facebook. To measure the performance of face recognition after compression with different encoders, a dataset with 2304 face images was used.

Then a test group with 1000 matching faces in the database and 1000 non-matching faces was created. For a face to be recognised there must be at least one and at most five matching images in the dataset. As can be observed in FIG. 11, the face recognition accuracy obtained from faces encoded with the disclosed transfer-learn autoencoder is again consistently higher than all other encoders, including the learning-based one pretrained with generic images.

In this disclosure a novel coding approach is described based on multiple autoencoders, each one specifically optimised for one object class. The disclosed encoding scheme consistently achieves better results than other standard encoders, including the state of the art VVC. It was demonstrated that fine-tuning of generic optimised autoencoders through transfer learning, yields improved compression efficiency and task-algorithm performance. Smart surveillance is one of the envisaged application fields of the present disclosure.

The term "comprising" whenever used in this document is intended to indicate the presence of stated features, integers, steps, components, but not to preclude the presence or addition of one or more other features, integers, steps, components, or groups thereof.

The disclosure should not be seen in any way restricted to the embodiments described and a person with ordinary skill in the art will foresee many possibilities to modifications thereof. The above-described embodiments are combinable.

The following claims further set out particular embodiments of the disclosure.

REFERENCES

[1] S. Liu, W.-H. Peng, and L. Yu, "Guest editorial introduction to special section on learning-based image and video compression," IEEE Transactions on Circuits and Systems for Video Technology, vol. 30, no. 7, pp. 1785-1788, 2020.

[2] Z. Cheng, H. Sun, M. Takeuchi, and J. Katto, "Deep convolutional autoencoder-based lossy image compression," in 2018 Picture Coding Symposium (PCS), 2018, pp. 253-257.

[3] J. Balle, V. Laparra, and E. Simoncelli, "End-to-end optimized image compression," in 5th International Conference on Learning Representations, Toulon, France, April 2017.

[4] J. Balle, D. Minnen, S. Singh, S. J. Hwang, and N. Johnston, "Variational image compression with a scale hyperprior," in 6th International Conference on Learning Representations, Vancouver, Canada, April 2018.

[5] L. Duan, J. Liu, W. Yang, T. Huang, and W. Gao, "Video coding for machines: A paradigm of collaborative compression and intelligent analytics," IEEE Transactions on Image Processing, vol. 29, pp. 8680-8695, 2020.

[6] L. D. Chamain, F. Racapé, J. Bégaint, A. Pushparaja, and S. Feltman, "End-to-end optimized image compression for machines, a study," in 2021 Data Compression Conference (DCC), 2021, pp. 163-172.

[7] R. Kalsotra and S. Arora, "Background subtraction for moving object detection: explorations of recent developments and challenges," The Visual Computer-International Journal of Computer Graphics, 2021.

[8] Z. Cheng, H. Sun, M. Takeuchi, and J. Katto, "Learned image compression with discretized gaussian mixture likelihoods and attention modules," in Proc. IEEE/CVF Conference on Computer Vision Pattern Recognition, March 2020, p. 7936-7945.

[9] D. Minnen, J. Balle, and G. Toderici, "Joint autoregressive and hierarchical priors for learned image compression," in Advances in Neural Information Processing Systems, 2018, p. 10794-10803.

[10] Labelled faces in the wild (Ifw) dataset. [Online]. Available: https://www.kaggle.com/jessicali9530/Ifw-dataset/version/4

[11] Flickr-faces-hq dataset (ffhq). [Online]. Available: https://github.com/NVlabs/ffhq-dataset

[12] Y. Wu, A. Kirillov, F. Massa, W.-Y. Lo, and R. Girshick. (2019) Detectron2. https://github.com/facebookresearch/detectron2. [Online]. Available: https://github.com/facebookresearch/detectron2

[13] J. Bégaint, F. Racapé, S. Feltman, and A. Pushparaja, "Compressai: a pytorch library and evaluation platform for end-to-end compression research," in CompressAI: a PyTorch library and evaluation platform for end-to-end compression research, 2020. [Online]. Available: https://arxiv.org/abs/2011.03029

[14] T. Xue, B. Chen, J. Wu, D. Wei, and W. T. Freeman, "Video enhancement with task-oriented flow," in International Journal of Computer Vision (IJCV), November 2019, p. 1106-1125.

[15] Toward a practical perceptual video quality metric. [Online]. Available: https://netflixtechblog.com/toward-a-practical-perceptual-videoquality-metric-653f208b9652

The invention claimed is:

1. An image compression method using segmentation and classification, comprising the steps of:

identifying regions in a received image comprised of image pixels;

segmenting the image pixels into segmented regions, each segmented region corresponding to an identified region, and into an image background comprised of image pixels, if existing, not belonging to any of the identified regions;

determining a class for each segmented image region from a plurality of predetermined image classification classes;

applying an image learning-based encoder to each segmented image region, according to the determined class of each segmented image region, wherein a specific image learning-based encoder has been preselected for each of the image classification classes from a pre-built library of image learning-based encoders which have been each pretrained with images of the respective preselected class;

outputting the encoded segmented image regions.

2. Method according to claim 1 wherein the identified regions are:

square or rectangular image regions;

image regions defined by their graphical image properties; or image regions defined by their content as identified by a previously trained content detector.

3. Method according to claim 1 wherein the identified regions are selected from a combination of:

square or rectangular image regions;

image regions defined by their graphical image properties; and image regions defined by their content as identified by a previously trained content detector.

4. Method according to claim 1 wherein the segmented regions defined by their graphical image properties, or defined by their content as identified by a previously trained content detector, of an arbitrary shape defined by a binary mask within a square or rectangular bounding box.

5. Method according to claim 1 wherein the class determination is partially or fully inherited from the region identification.

6. Method according to claim 1 wherein the identified regions are hierarchical, each identified region comprising zero, one or more identified sub-regions, said identified sub-regions, after having been identified and segmented, being processed as an identified region.

7. Method according to claim 1 wherein the segmented regions are non-overlapping image regions.

8. Method according to claim 1 wherein the segmented regions are non-uniform in size and shape.

9. Method according to claim 1 wherein the spatial resolution of each identified region is adapted according to the library of image learning-based encoders being used.

10. Method according to claim 1 wherein the library of image learning-based encoders is a library of convolutional neural network, CNN, autoencoders.

11. Method according to claim 10 wherein an autoencoder comprises a pipeline of convolutional layers and activation layers, forming an encoder, for generating a latent representation of an input with reduced dimensionality, followed by a quantization function, entropy coder and then a decoder counterpart, trained for dimensionality reduction of the latent representation, where the latent representation has a normal distribution.

12. Method according to claim 1 comprising identifying regions in the received image by using object-detecting learning-based full-image networks, in particular Yolo or Detectron2 networks.

13. Method according to claim 1 comprising applying a conventional hybrid encoder to the image background, in particular a MPEG-like encoder, such as H.264, HEVC or VVC.

14. Method according to claim 1 comprising the application of a centring step to each segmented region, after the image pixels have been segmented into each segmented region.

15. Method according to claim 1 wherein the image classification classes are defined as people, faces, bags, boxes, backpacks, or carry-on items, or combinations thereof, corresponding to image regions classified as being image regions containing visual objects termed as semantic content, in particular an image of a person or of a person's face, respectively.

16. Method according to claim 1 comprising pretraining the library of image learning-based encoders using datasets of images containing regions of the same class as the preselected image classification class for each encoder.

17. Device for compressing image data by segmentation and classification image processing, comprising an electronic data processor configured to carry out the steps of:

identifying regions in a received image comprised of image pixels;

segmenting the image pixels into segmented regions, each segmented region corresponding to an identified region, and into an image background comprised of image pixels, if existing, not belonging to any of the identified regions;

determining a class for each segmented image region from a plurality of predetermined image classification classes;

applying an image learning-based encoder to each segmented image region, according to the determined class of each segmented image region, wherein a specific image learning-based encoder has been preselected for each of the image classification classes from a prebuilt library of image learning-based encoders which have been each pretrained with images of the respective preselected class;

outputting the encoded segmented image regions.

18. Device according to claim 17 comprising a multiplexer for joining the output encoded segmented image regions into a data stream.

19. Device according to claim 18 further comprising a demultiplexer for splitting the joined encoded segmented image regions from the data stream.

20. Device according to claim 19 further comprising a prebuilt library of image learning-based decoders which have been each pretrained with images of the respective preselected class, for decoding each of the split encoded segmented image regions.

21. Device according to claim 20 comprising a combiner for combining the decoded segmented image regions into an uncompressed image.

22. Non-transitory computer-readable medium comprising program instructions that when executed by an electronic data processor cause it to carry out the method of claim 1.

23. Computer program comprising program instructions that when executed by an electronic data processor cause it to carry out the method of claim 1.

* * * * *